July 24, 1934.  J. S. McWHIRTER  1,967,835
APPARATUS FOR REFINISHING VEHICLE WHEELS
Filed May 12, 1933   3 Sheets-Sheet 1
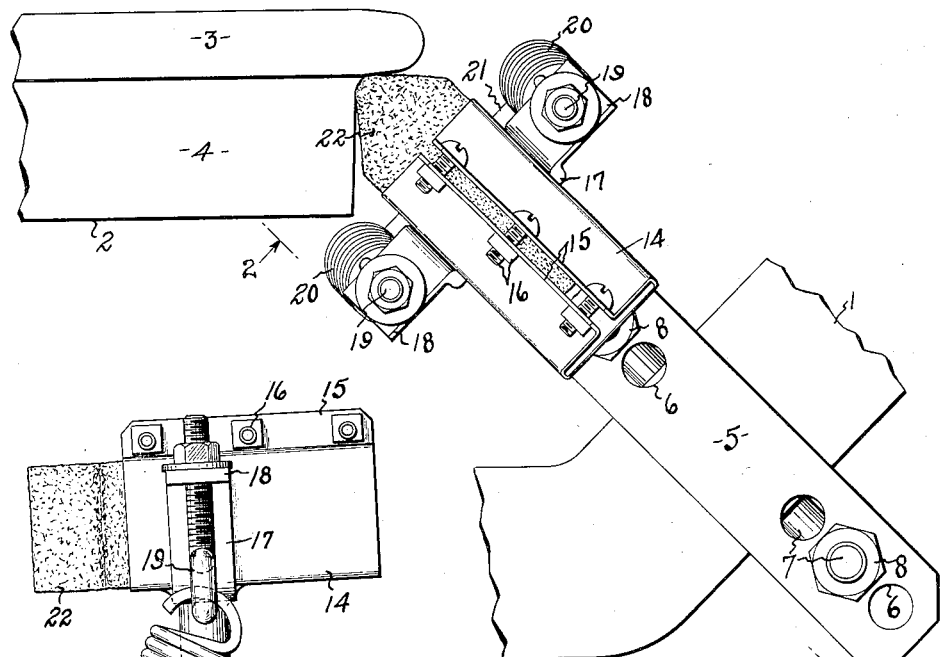
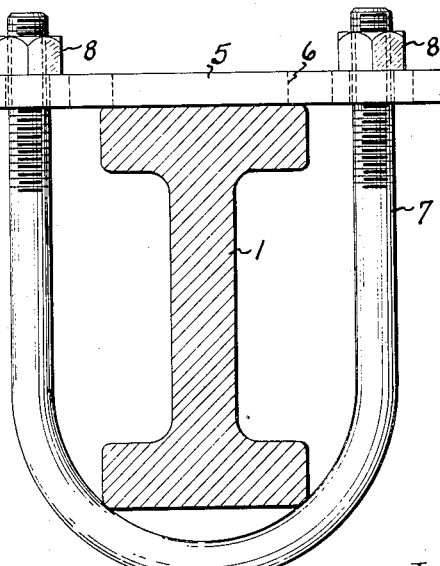
INVENTOR
John S. McWhirter
BY Darby & Darby
ATTORNEYS July 24, 1934.  J. S. McWHIRTER  1,967,835
APPARATUS FOR REFINISHING VEHICLE WHEELS
Filed May 12, 1933   3 Sheets-Sheet 2
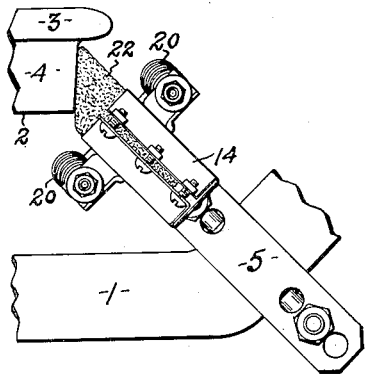
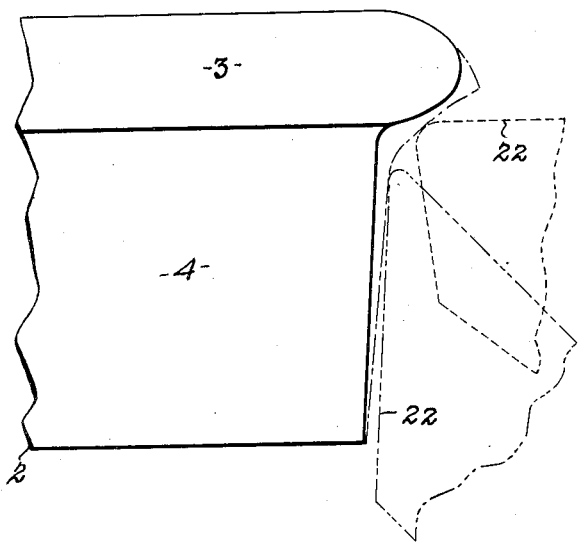
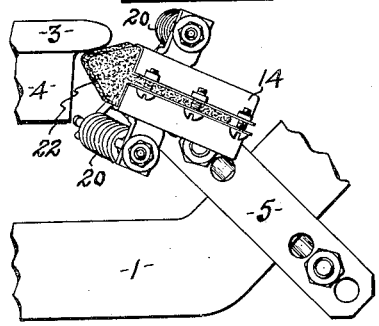
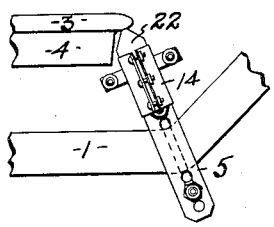
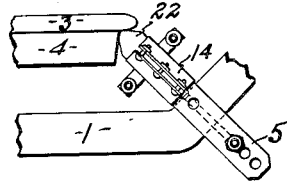
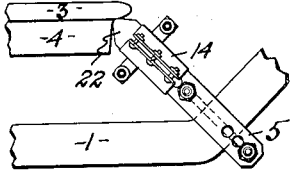
INVENTOR
John S. McWhirter
BY Darby & Darby
ATTORNEYS July 24, 1934. J. S. McWHIRTER 1,967,835
APPARATUS FOR REFINISHING VEHICLE WHEELS
Filed May 12, 1933  3 Sheets-Sheet 3
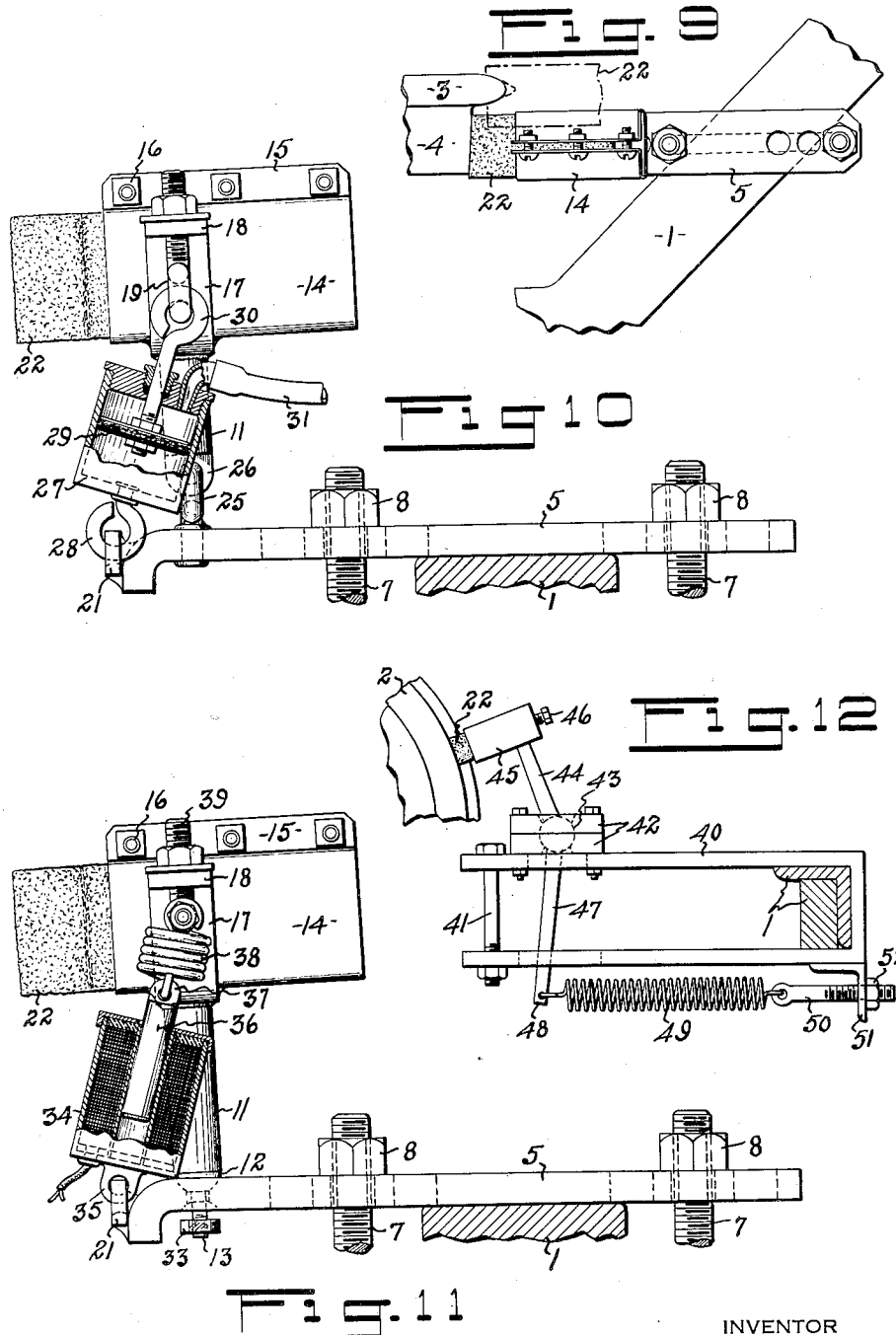
INVENTOR
John S. McWhirter
BY Darby & Darby
ATTORNEYS Patented July 24, 1934

1,967,835

UNITED STATES PATENT OFFICE 1,967,835

APPARATUS FOR REFINISHING VEHICLE WHEELS

John S. McWhirter, Southport, Conn.

Application May 12, 1933, Serial No. 670,739

12 Claims. (Cl. 51—255)

This invention relates to improvements in method and apparatus for refinishing or truing vehicle wheels such as steel wheels of street cars and the like.

An object of this invention is to provide a method and apparatus by means of which the tread surface and flange of car wheels may be reshaped or refinished to return them to their original form after they have become worn.

An important object of this invention is to provide a method and apparatus by means of which the refinishing and resurfacing operation may be carried out without removing the wheels from the car and while the car is in use.

A still further object of this invention is to provide an improved method and apparatus for reshaping the tread, the flange and the connecting fillet so that the wheels regain substantially their original form.

A still further object of this invention is to provide a grinding device which may be applied to the truck or other structure adjacent the wheels which device is capable of universal movement on its support whereby the relative movement between the truck or other support and the wheel does not disturb the correct contact between the grinding device and the wheel but on the contrary is advantageously employed in refinishing the wheel.

These and many other objects as will be apparent from the following description are successfully secured by means of this invention.

This invention resides substantially in the combination, construction, arrangement, relative location of parts, step and series of steps, all as will appear more fully hereinafter.

Referring to the drawings,—

Figure 1 is a top plan view of the device of this invention as associated with the truck frame and wheel showing portions of the truck frame and wheel;

Fig. 2 is a side elevational view of the device as viewed along the line 2—2 of Figure 1 showing the truck frame in cross section;

Figures 3, 5, 6, 7, 8 and 9 are top plan views of the device showing the relative positions to which it may be adjusted on the truck frame with respect to the wheel;

Fig. 4 is a diagrammatic view illustrating the operation of the tool and showing in dotted outline the shape of the worn wheel and indicating the metal to be removed to re-shape it;

Fig. 10 is a vertical side elevational view of a modified form of the device with some parts in cross section and some parts broken away;

Fig. 11 is a similar view of a still further modified form of device;

Fig. 12 is a side elevational view of another modification employing the principles of this invention showing some parts broken away and some parts in cross section.

The tires and flanges of vehicle wheels such as are employed on street cars for example, as those skilled in the art are well aware of, are subjected to conditions of uneven wear which gradually deform the surface of the wheel which contacts with the rail head. It becomes necessary, therefore, from time to time to refinish the wheel to return the tire surface and flange to their normal shape. Heretofore the common shop practice has required the removal of such worn wheels for the purpose of reshaping them. This naturally takes the car out of service and involves considerable expense both in labor and equipment. It is also current shop practice to take the cars out of service and refinish the wheels on the car with a pit grinder for example. In these prior practices, special equipment has been provided with which the wheel is finished. It has been the desire of those familiar with the art to be able to refinish worn car wheels without removing them from the car and to accomplish this work without removing the car from regular passenger service.

Some attempts have been made to devise methods and apparatus seeking to attain the ideal condition of refinishing the wheel on the car and without taking the car out of service. Such attempts have not been successful, because the devices employed, were not capable of imparting to the refinished wheel substantially its original form. The present invention has demonstrated by actual practice complete capability of refinishing and truing a car wheel to substantially its original form while on the car and while the car is in service. This has been accomplished by the methods and devices of this invention because the refinishing tool, preferably an abrasive block, has been mounted in a carrier or chuck capable of universal movement and capable of absorbing the relative movement between the car wheel and truck incident to normal operation of the car. It is this characteristic which has rendered the device of this invention completely successful in solving the problem and which distinguishes it from prior attempts to solve this problem with similar devices.

The details of structure will now be given for several forms of the device in accordance with this invention with direct reference to the drawings.

A portion of the car truck, is shown at 1 and a portion of the wheel is shown at 2, having the usual tire or tread surface 4 and flange 3. In a correctly shaped wheel the surface of the tire is truly cylindrical and forms a truncated cone. Formed integral with the tire is the flange 3 which has a rounded nose and the surface of which runs into the tire surface through a curve which approximates somewhat the curve of the rail head. When the wheel is worn it takes on a distorted form indicated by way of example by the dotted line in Fig. 4. To properly re-shape the wheel, the material bounded by the dotted line and the solid line indicating the true outline shape of the wheel, must be removed. As, of course, is well known, the car wheels are journaled in journal boxes mounted on trucks. The nature of this construction is such as to permit relative movement between the car wheels and trucks which, incidentally, is one of the causes of uneven wear of the car wheels. It is because of this relative movement between the wheels and trucks, and particularly the lateral relative movement therebetween which has prevented prior devices from solving this problem.

The device of this invention comprises a clamp made up of a plate or bar 5 having a plurality of centrally aligned holes 6 therein. The three threaded ends of the legs of a U-shaped bar 7 encircle the truck frame 1, pass through the holes 6 and serve to clamp the bar 5 in place in conjunction with the nuts 8. One end of the bar 9 is provided with semi-circular depressions 9 opening outwardly and joined by a smaller passage 10. At 11 is a rod or standard having a reduced central pin 13 and a mounted semi-circular end 12. The semi-circular end rests in the upper socket 9 and the pin 13 passes through the hole 10.

Mounted upon the upper end of the standard 11 and secured thereto in any suitable manner, is a U-shaped clamp 17 provided with laterally extending ears 18 having holes therethrough. Secured within the U-shaped yoke 17 is a chuck or clamp 14 in this case made of sheet metal of suitable thickness. This chuck is longitudinally slotted and provided with parallel flanges 15 through which tightening bolts 16 pass and which in connection with nuts act to clamp the block 22 of abrasive material in the chuck. At 19 are eye bolts which pass through the holes in the ears 18 and are provided with nuts as shown. Secured to the end of the bar 5 is a transverse bar 21 having holes at its ends. Secured between each end of the bar 21 and the corresponding eye bolt 19, are the heavy springs 20.

It will be apparent from the construction that the standard 11 and the parts secured thereto, are capable of universal movement about the lower end of the standard as a pivot. Thus, although the springs 20 cause the block 22 to bear against the surface of the wheel under suitable pressure, it is apparent that the chuck may yield about the pivot point of standard 11 in any direction to compensate for any relative movement between the wheel and truck. The springs of course at all times act to maintain pressure of the block 22 on a wheel surface. It will be noted that bar 21 is rounded quite close to the pivot point of standard 11. This insures that as the block 22 wears away the springs 20 will exert a substantial uniform pressure thereof on the wheel. Very little variation in this pressure occurs because the lower end of the springs 20 are anchored as close as is feasible to the pivot point of standard 11.

The nose of one end of the block is tapered and mounted so that it is suitably shaped to impart the proper curve to the fillet. The tension on springs 20 may be varied relatively to each other so as to cause the carrier or chuck to exert the proper pressure in the correct direction as inspection of the worn wheel will indicate as required. For example, referring to Figure 1, the right hand eye bolt may be drawn upwardly by turning the nut, increasing the tension on the right hand spring and causing the block to exert greater pressure against the inside of the flange. This action may be further aided by reducing the tension on the other spring.

Figure 5 indicates how the chuck may swing around under the action of the springs to exert any desired pressure on the inside of the wheel flange.

Figure 3 indicates how the device may be mounted on the truck when the end of the block 22 is tapered.

Figure 6 shows a still further relative positioning of the parts.

In Figure 7 is illustrated the adjustment of the parts when the wheel is close to the truck in which case the plate 5 may be shifted to the right, longitudinally by employing a different set of holes 6.

In the case of Figure 8 the wheel is further from the truck and the plate 5 is shifted to the left to compensate for this variation.

Figure 9 shows a positioning of the device when the end of the block 22 is square and the truck frame extends at a different angle.

The block of abrasive material may be tapered and rounded at one end as clearly indicated in the drawings and square at the other end which end may be notched as indicated at Figure 9 so that it may be applied directly to the flange when necessary. These different views illustrate the universal capabilities of the structure. Whenever the car is in motion there is continual relative movement between the wheels and trucks. It is this very movement which is taken advantage of with the device of this invention to insure the correct finishing of the wheel surface. Because the parts including those of the device are permitted free, relative movement, the abrasive block does not groove or scratch the wheel but imparts to it a highly finished surface. The device may be adjusted so as to contact with any desired portion of the tire surface, the flange surface and the fillet which joins them.

In Figure 10 is shown a modified arrangement in which compressed air is employed in place of the springs 20. In this case a pair of small air cylinders 27, provided with eyelets 28 at the bottom ends are connected to the ends of the cross bar 21. Each piston 29 has a piston rod on the end of which is formed a loop 30, which connects with the eye bolts 19. At 31 is the connection from the fluid pressure source, such as the compressed air reservoirs employed on the car brakes. The pipe 31 supplies a constant fluid pressure to the cylinder providing an action quite comparable to that provided by the springs 20.

Obviously valves could be employed in each connection to vary the pressure in the cylinders relatively to get the same action as occurs in the case of the use of springs. In addition, the eye bolts may be vertically adjusted, if desired. It will be noted in this form of device, that a different form of connection is employed between the standard 11 and the bar 5. In this case an eye member 25 is secured to the bar and passes through an opening in the lower end 26 of the standard 11. This permits of a universal movement of the standard on the plate 5 and insures that the chuck or carrier cannot get loose from the plate as is possible with the arrangement in Figures 1 and 2.

In Figure 11 a further modification is shown in which solenoids are employed. In this case the solenoid casing 34 is provided with aperture lug 35 which connects with the cross bar 21. Within the casing is a solenoid winding having a plunger core 36 which is connected at its upper end 37 with the lower end of a spring 38. The upper end of this spring is connected with a bolt 39 which may be vertically adjustable. There are of course, two sets of solenoids, plungers and springs, one on each side of the chuck. The springs 38 are employed in this case in order to give a greater freedom of action than would occur if the plungers were rigidly connected to the bolts 39, and to permit relative adjustment of the tension of the springs to adapt the device for refinishing the wheels at any part thereof.

Here again, the pull of the solenoids may be varied relatively by the insertion of variable resistances in the surface thereof. In this structure a different form of universal connection between the standard 11 and the plate 5 is shown. The lower end of standard 11 is rounded as in the case of Figure 1 and provided with a central pin 13 which, in this case, is threaded. A hemispherical washer 32 fits over this pin and is held in place by means of a nut 33. This permits of a universal movement of the standard but prevents the standard from getting loose from the bar 5.

The action of both of these devices is quite similar to that of the form shown in Figures 1 and 2.

A still further modification but a less desirable one from an operational standpoint is shown in Figure 12. In this case the plate 5 is replaced by means of a U-shaped yoke 40 which fits over the truck frame 1 and is clamped thereto by means of a bolt 4. Mounted on the upper arm of the clamp is a pair of blocks 42 having complementary hemispherical recesses which open into holes extending through the remainder of the blocks. A ball 43 is seated in the socket thus formed and is provided with a projecting arm 44 on which is mounted a chuck 45. This chuck supports the abrasive block 22 and has an adjusting bolt 46 which bears against the end of the block. If desired, of course, a spring can be interposed between the block 22 and the bolt 46. Projecting downwardly from the ball 43 is an arm 47 provided with transversely extending arms 48. A transverse bar 51 is likewise secured to the clamp 40.

A pair of springs 49 are connected to the arms 48 at one end and at the other end connected to longitudinally adjustable eye bolts 50 so that the tension on the springs may be varied by turning the nuts 52. With this arrangement a substantially, universal joint support is provided for the chuck.

The advantage of the structure of this invention may be summed up by observing that the abrasive block is resiliently urged against the desired surface of the wheel tread and flange which pressure is maintained for all relative movement between the truck and wheel and for all wear which occurs on the abrasive block. It will be apparent that this structure will absorb relative movement either transversely of the truck and plane of the wheel, movements radially of the wheel including those permitted by the truck springs and all movements intermediate these extremes.

From the above description it will be apparent that this invention resides in certain principles of construction, operation and use which may be embodied in other structures and carried out in other ways without departure from the scope of this invention.

I do not therefore desire to be strictly limited to the disclosure as given for purposes of illustration, but rather to the scope of the appended claims.

What I seek to secure by United States Letters Patent is:—

1. The combination for use with a car wheel and truck, comprising a tool, a carrier for said tool, means including a universal joint for connecting the carrier to the truck and means for urging the carrier towards the wheel so that the tool bears thereagainst.

2. In an apparatus as described, for use with a car truck and a car wheel journaled therein the combination comprising a support secured to the truck, a tool, a carrier for said tool, a universal connection between the support and carrier and means for urging the carrier towards the wheel.

3. In an apparatus as described, for use with a car truck and a car wheel journaled therein, the combination comprising a support secured to the truck, a tool, a carrier for said tool, a universal connection between the support and carrier and resilient means interconnecting the carrier and the support.

4. In an apparatus as described, for use with a car truck and a car wheel journaled therein, the combination of a support secured to the truck, a tool, a carrier for said tool, a universal connection between the support and carrier and compressed air means interconnecting the carrier with the support.

5. In an apparatus as described, for use with a car truck and a car wheel journaled therein, the combination comprising a support secured to the truck, a tool, a carrier for said tool, a universal connection between the support and carrier and an electro-magnetic means interconnecting the carrier and the support.

6. In an apparatus as described, for use with a vehicle truck and wheel, a tool carrier, means for connecting the carrier to the truck to permit universal movement of the carrier with respect to the truck and resilient means interconnecting the carrier with the truck.

7. In an apparatus as described, for use with a car wheel and truck, a tool carrier, a support secured to said truck means forming a universal connecting joint between the carrier and said means and a pair of resilient connecting links between the carrier and said means, said resilient links being spaced on each side of the universal connecting joint.

8. A device for truing wheels comprising a supporting bar, means forming a clamp with said bar, an abrasive tool having beveled edges, chuck means having a universal joint connection between the tool carrier and said bar, a pair of springs each anchored at one end to said bar and adjustable means for connecting the other end of said springs to said tool chuck.

9. A device as described comprising a supporting clamp, a standard having a universal connecting joint with said clamp, a tool chuck mounted on said standard and a pair of resilient means interconnecting the tool chuck with said clamp and mounted on opposite sides thereof.

10. A device as described comprising a supporting clamp, a standard having a universal connecting joint with said clamp, a tool chuck mounted on said standard and a pair of springs interconnecting the tool chuck with the clamp on opposite sides thereof.

11. A device as described comprising a supporting clamp, a standard having a universal connecting joint with said clamp, a tool chuck mounted on said standard and a pair of pneumatic cylinders interconnecting the tool chuck with the clamp on opposite sides thereof.

12. A device as described comprising a supporting clamp, a standard having a universal connecting joint with said clamp, a tool chuck mounted on said standard, a pair of solenoids secured to said clamp on opposite sides of the tool chuck and a plunger for each solenoid secured to the tool chuck.

JOHN S. McWHIRTER.